3,326,852
RESINOUS POLYMERIC PHOSPHONATES
Ian M. Thomas, Toledo, Ohio, assignor to Owens-Illinois, Inc., a corporation of Ohio
No Drawing. Filed Aug. 10, 1964, Ser. No. 388,664
12 Claims. (Cl. 260—47)

ABSTRACT OF THE DISCLOSURE

Flame-resistant resinous polymeric phosphonates are obtained by a condensation-polymerization reaction of reactants comprising (A) an organophosphonodihalide,

where R=alkyl (including cycloalkyl) aralkyl, aryl or alkaryl radicals and X=Cl or Br; (B) a dihydroxy aromatic compound; and (C) an aromatic compound having at least three —OH groups attached directly to the aromatic nucleus. The —OH groups of reactants (B) and (C) are attached to non-adjacent carbon atoms. Molar proportions are such that approximate stoichiometrical amounts of X and of —OH groups are present in the total reactants. The molar amount of reactant (C) is from ca. 1 to ca. 50 mole percent of the total molar amount of reactants (B) and (C). Examples of the (A), (B) and (C) reactants are, respectively, phenylphosphonic dichloride, hydroquinone and phloroglucinol.

---

The usual polymers are cross-linked, the solubility and other properties of the polymer varying with the degree of cross-linking which latter is dependent upon the proportion of reactant (C).

The polymers are useful, for instance, in making self-supporting films, laminated articles, coating compositions, and especially as an adhesive or bonding agent, e.g., in bonding glass-to-glass and steel-to-glass.

The invention relates broadly to condensation polymers and, more particularly, to such polymers which are resinous, polymeric phosphonates.

The present invention is especially concerned with compositions, products, articles and the like comprising a condensation polymer of ingredients or reactants comprising or, preferably, consisting essentially of (A) an organophosphonic dihalide represented by the general formula

I

where R represents a radical selected from the group consisting of alkyl (including cycloalkyl), aralkyl, aryl and alkaryl radicals, and X represents a radical selected from the group consisting of chlorine and bromine atoms, (B) a dihydroxy aromatic compound, more particularly a dihydroxy aromatic hydrocarbon, wherein the hydroxy groups are attached directly to the aromatic nucleus and wherein the said hydroxy groups are attached to non-adjacent carbon atoms, and (C) an aromatic compound, more particularly an aromatic hydrocarbon, having at least three hydroxy groups attached directly to the aromatic nucleus and wherein the said hydroxy groups are attached to non-adjacent carbon atoms. The reactants of (B) and (C) are otherwise free from groups that are reactive under the reaction conditions.

The reactants of (A), (B) and (C) are used in molar proportions such that approximately stoichiometrical amounts of halogen and of hydroxyl groups are present in the total reactants, while the reactant of (C) is employed in a molar amount corresponding to from about 1 to about 50, more particularly from about 5 to about 25, mole percent of the total molar amount of the reactants of (B) and (C).

Formulations are not precluded wherein reactant (B), the dihydroxy compound, is omitted; that is, reactant (C) may constitute up to 100 mole percent of the total molar amount of (B) and (C). However, higher molar amounts of polyhydroxy (e.g., trihydroxy, tetrahydroxy, etc.) reactant (C) ranging from substantially above 50 mole percent to 100 mole percent of the total molar amount of (B) and (C) are generally to be avoided because of the less desirable properties (e.g., excessive brittleness) of the resulting condensation polymer.

Illustrative examples of alkyl (including cycloalkyl) radicals represented by R in Formula I are methyl, ethyl, and propyl through octadecyl (both normal and isomeric forms), cyclopentyl, cyclohexyl, cycloheptyl, etc.; of aralkyl radicals: benzyl, phenylethyl, phenylpropyl, phenylbutyl, xenylmethyl, naphthylmethyl, naphthylethyl, etc.; of aryl: phenyl, biphenylyl or xenyl, naphthyl, benzonaphthyl, anthracyl, phenanthryl, fluorenyl, etc.; and of alkaryl: tolyl, xylyl, trimethylphenyl, mono-, di- and triethyl- through trioctadecylphenyl, mono-, di- and trimethyl- and triethylnaphthyl, and mono-, di- and trimethyl- and triethylanthracyl, etc.

It was suggested prior to the present invention, e.g., in Coover, Jr., et al., U.S. Patent No. 2,716,101, that resinous polymeric organophosphonates be prepared by heating together, in the presence of an anhydrous alkaline-earth halide condensation catalyst (e.g., $CaCl_2$, $ZnCl_2$ and, especially, $MgCl_2$), a mixture comprising 50.0 mole percent of a dihydroxy aromatic compound, from 0.1 to 49.9 mole percent of an organophosphonic dichloride, and from 49.9 to 0.1 mole percent of a trifunctional phosphorus compound, at a temperature of from 90° C. to 300° C. until the condensation reaction is substantially complete.

The present invention is based on my discovery that the use of a catalyst can be obviated and cross-linked condensation polymers that are hard and tough at ambient temperatures can be obtained by using a higher polyhydroxy (i.e., above dihydroxy) aromatic compound, such as a trihydroxy aromatic hydrocarbon, wherein the hydroxy groups are attached to non-adjacent carbon atoms instead of a trifunctional phosphorus compound as in Coover et al., and by employing the reactants and molar proportions thereof set forth in the forepart of this specification. This was quite surprising and unobvious, since ordinarily it would have been expected that trihydroxy aromatic compounds, more particularly trihydroxy aromatic hydrocarbons, are the full equivalent of trifunctional phosphorus compounds in a reaction thereof with an organophosphonic dichloride and a dihydroxy aromatic compound in producing linear condensation polymers. Additional evidence of the non-equivalency of the triols used by the present applicant and the trifunctional phosphorus compounds employed by Coover et al. is found in the fact that the former are much more reactive than the latter and, also, are less volatile. Because of the lesser volatility of the triols as compared with the aforementioned phosphorus compounds, the former will remain in the reaction mass under the reaction conditions, thereby assuring complete reaction.

The usual condensation polymers of this invention are cross-linked, and are characterized by their unobvious properties that make them eminently suitable for use as adhesive, bonding, laminating, coating and similar compositions where the applied resinous material must adhere tenaciously to a substrate and form a strong bond thereto or between adjacent laminae in the case of laminated articles. In general, they have a surprising and unexpectedly high order of adhesiveness in addition to their other useful properties.

Self-supporting films or sheets can be made from polymers of this invention, and especially from those having less than about 10%, more particularly not appreciably exceeding about 5%, of cross-linking therein; that is, from polymers having an average of less than 1 cross-linked unit for every 9 recurring units, and, more particularly, an average not appreciably exceeding about 1 cross-linked unit for every 19 recurring units.

The condensation polymers of this invention vary in color from almost colorless to brown. Their softening and melting points are largely determined by the amount of cross-linking therein. The latter can be controlled, for example, by varying the proportion of the polyol cross-linking reactant, i.e., reactant (C), supra. The softening points vary, for instance, from about 100° C. in the case of polymers averaging from about 2–5% cross-linking to 300° C. and higher when the polymers contain about 25%, or perhaps a little more, of cross-linking. In general, polymers containing 25% and more of cross-linking are hard and brittle whereas those below about 25% cross-linking are hard and tough.

Polymers containing not more than about 5% cross-linking swell and are partly soluble in certain organic solvents, e.g., dimethylformamide, and chlorinated hydrocarbon solvents, e.g., chloroform, carbon tetrachloride and the like. When cross-linking exceeds substantially more than about 5%, the polymers are insoluble in all common organic solvents; but some organic solvents, especially dimethylformamide and chlorinated hydrocarbons, cause such polymers to swell when immersed therein. Above about 15% cross-linking, the polymers are insoluble and will not swell in such solvents as mentioned above.

Hydrolytic stability of polymers of the invention increases with an increase in cross-linking. Whereas a 5% cross-linked polymer will show evidence of hydrolysis after 15 minutes in boiling water, a 25% cross-linked polymer is stable for several hours in boiling water. Strong bases, e.g., a 40% aqueous sodium hydroxide solution, will dissolve or decompose the polymers of the invention after immersion therein for a few minutes at the boiling point; and the same is true with respect to concentrated sulfuric acid at 100° C.

The polymers of this invention are flame-resistant. They will burn with a luminous flame when introduced into the flame of a Bunsen burner; but upon withdrawal the flame is immediately extinguished.

The condensation polymers with which this invention is concerned have excellent thermal stability. In most cases they show only about 1% weight loss after heating in air at 300° C. for 2 hours, and a further weight loss of about 1 to 2% when heated in air at 350° C. for 2 hours.

Clear, strong, self-supporting films can be prepared by pressing the powdered polymer in a press heated to the flow point of the polymer. This is illustrated by the following example: A resinous condensation polymer was prepared, as hereafter more fully described, from phenylphosphonic dichloride, hydroquinone and phloroglucinol containing an average of 1 cross-link for every 19 recurring units. This polymer was pulverized, and a portion of it was placed in a press heated to 220° C. Upon applying a pressure of about 10 lbs./sq. in. for a few minutes, a thin clear film was obtained. This film could be creased without cracking.

By sandwiching six layers of typical laminating sheets or fabrics, e.g., glass cloth in one instance and paper in another case, between seven of these films and pressing at about 220° C. and under a pressure of about 20 lbs./sq. in. for a few minutes, hard laminates were produced. These laminates could be flexed only with difficulty by hand, and the laminations could not be pulled apart by hand.

Laminates having similar characteristics can be prepared by pressing at 220° C., and under a pressure of about 20 lbs./sq. in., alternate layers of (a) glass cloth or (b) paper and a powdered condensation polymer of this invention. The properties of these laminates are similar to those hereinbefore described.

Illustrative examples of organophosphonic dihalides that may be used in practicing the present invention are the methyl-, ethyl-, and propyl- through octadecylphosphonic dichlorides and dibromides, preferably those containing not more than 12 carbon atoms in the alkyl (normal or isomeric alkyl) substituent; cyclopentyl- and cyclohexylphosphonic dichlorides and dibromides; benzyl-, phenylethyl- and xenylmethylphosphonic dichlorides and dibromides; phenyl-, xenyl- and naphthylphosphonic dichlorides and dibromides; and tolyl-, xylyl- and trimethylphenylphosphonic dichlorides and dibromides. Other examples will be apparent to those skilled in the art from Formula I and the numerous illustrative examples of radicals represented by R.

Illustrative examples of suitable dihydroxy aromatic compounds, more particularly dihydroxy aromatic hydrocarbons, wherein the hydroxy groups are attached to non-adjacent carbon atoms, include hydroquinone, resorcinol, the o,o'-, m,m'- and p,p'-dihydroxydiphenyls, naphthalenediols such as the 1,3-, 1,4-, 2,4-, 1,5-, 2,5-, 1,6-, 2,6-, 1,7- and 2,7 - naphthalenediols, rufol (1,5 - anthracenediol), chrysazol (1,8 - anthracenediol), flavol (2,6-anthracenediol), p,p'-isopropylidenediphenol, phenylhydroquinone, methylhydroquinone, trimethylhydroquinone, t-butylhydroquinone and 2,5-di-t-butylhydroquinone. Other examples of dihydroxy aromatic compounds, in addition to those just named, are p,p'-sulfonylbiphenol, p,p'-oxybiphenol and others that will be apparent to those skilled in the art, wherein two monohydroxybenzene groups are linked together by an intermediate atom or group.

Illustrative examples of suitable trihydroxy (and higher) aromatic compounds, more particularly trihydroxy (and higher) aromatic hydrocarbons, wherein the hydroxy groups are attached to non-adjacent carbon atoms, are:

phloroglucinol (1,3,5-trihydroxybenzene)
2,4,6-trihydroxytoluene
1,4,5-trihydroxynaphthalene
1,4,5,8-tetrahydroxynaphthalene
4,4',4''-trihydroxytriphenylmethane
4,4',4''-trihydroxy-3-methyltriphenylmethane
2,5,2',5'-tetrahydroxydiphenyl
3,5,3',5'-tetrahydroxydiphenyl
2,5,2',4'-tetrahydroxydiphenyl
2,2',2''-trihydroxy-5,5',5''-trimethyl-m-terphenyl
1,4,9,10-tetrahydroxyanthracene
5,7,12,14-tetrahydroxypentacene
1,9,10-trihydroxyanthracene
3,5,4'-trihydroxystilbene
3,5,2',4'-tetrahydroxystilbene The use of dihydroxy and/or higher polyhydroxy, e.g. trihydroxy, aromatic compounds containing other substituents that remain attached to the ring (benzene, naphthalene, etc.) nucleus during the course of the reaction, e.g., halogen such as chlorine, is not precluded. Such substituents may be present up to the saturation point of the aromatic ring.

As previously indicated, instead of using an unsymmetrical trihydroxy aromatic compound, one may use an aromatic compound containing more than three (e.g., four or more) hydroxy groups attached to non-adjacent carbon atoms of the aromatic ring(s). Such higher polyhydroxy aromatic compounds may be used alone or, preferably, admixed with a trihydroxy aromatic compound, more particularly a trihydroxy aromatic hydrocarbon.

The polymers of this invention are prepared by effecting a condensation reaction, under anhydrous conditions and at a temperature within the range of from about 70° C. (generally a minimum above about 90° C., e.g., 100°–140° or 150° C.) up to about 300° or even 320° C. or higher, between an organophosphonic dihalide of the kind embraced by Formula I, at least one dihydroxy aromatic compound, i.e., reactant (B), and at least one trihydroxy (or higher polyhydroxy) aromatic compound, i.e., reactant (C), in the molar proportions hereinbefore given. The dihydroxy aromatic compound of (B) and the higher polyhydroxy aromatic compound of (C) are preferably dihydroxy- and trihydroxy-substituted hydrocarbons.

The reaction is ordinarily carried out while agitating the reaction mass, e.g., by mechanical stirring. It is also normally desirable to effect the reaction while maintaining an atmosphere of an inert, dry (i.e., anhydrous) gas over the reaction mass, e.g., nitrogen, argon, helium, etc. The reaction is carried out until condensation between the reactants is substantially complete. If desired, the dry inert gas can be bubbled through the reaction mass to aid in the removal of the hydrogen halide (HCl or HBr).

To shorten the period of the reaction, which may vary from about 2 to 24 hours or more depending, for example, upon the particular technique employed, the size of the batch and other influencing variables, it is usually advantageous to increase the temperature and to use reduced pressures toward the end of the reaction period.

Ordinarily the reactants are mixed together, in the presence or absence of a suitable, inert, anhydrous liquid reaction medium (solvent or diluent), and the reaction is carried out between the mixed reactants as above described. However, if desired, one may add only part of the organophosphonic dihalide to the full amount of the dihydroxy aromatic compound, and then allow the reaction to initiate and continue for a while at, for example, 100°–150° C. Thereafter the remainder of the organophosphonic dihalide is added, followed by the predetermined amount of trihydroxy (or higher polyhydroxy) aromatic compound. The latter, which functions as a cross-linking agent, may be added in various ways, e.g., all at once, as a continuous feed or in increments; or, as shown by some of the examples, the cross-linking polyol may be added after reaction has proceeded for some time between the other reactants. Heating is continued as above described to eliminate the hydrogen halide and to complete the reaction.

Illustrative examples of inert, anhydrous, liquid, reaction media in which the reaction may be effected, during at least part of the reaction period, include the saturated aliphatic hydrocarbons, e.g., heptane through dodecane (both normal and isomeric forms); aromatic hydrocarbons, e.g., benzene, toluene, xylene, etc.; the various halogenated aromatic hydrocarbons including, for example, the various chloro- and bromobenzenes and toluenes, etc.; and the various halogenated saturated alipathic hydrocarbons including, for instance, carbon tetrachloride, ethylene bromide, ethylene chloride, ethylene chlorobromide, unsym. and sym. tetrachloro- and tetrabromoethanes, 2-bromo-1-chloropropane, 1-bromo-2-chloropropane, propylene chloride, isobutylene bromide, trimethylene chloride, propylidene chloride and bromide, 1,1-dibromo-, 1,2-dibromo-, 1,3-dibromo- and 2,2-dibromopropanes, 2,2-dichloropropane, pentamethylene dichloride, etc. Other examples include ethers, e.g., m-dioxane, p-dioxane, mixtures of m- and p-dioxanes, pentamethylene oxide, tetrahydrofurfuryl ethyl ether, diethylene glycol diethyl ether, and the various normal and isomeric dialkyl ethers, especially those boiling within the range of from about 90° C. to about 210° C. at atmospheric pressure, e.g., di-n-propyl ether, n-butyl ether, isobutyl ether, ethyl butyl ether, methyl amyl ether, methyl benzyl ether, phenyl butyl ether, and other known ethers which are liquid at the reaction temperature. Other examples of inert, anhydrous, liquid, reaction media will be apparent to those skilled in the art from the foregoing illustrative examples.

By "inert" or "substantially completely inert," anhydrous, liquid medium or liquid reaction medium is meant an anhydrous, liquid medium which is so inert or non-reactive toward the reactants and the reaction product that it will not adversely affect the course of the reaction or the construction of the reaction product. By "anhydrous" or "substantially completely anhydrous" liquid medium (or liquid reaction medium) is meant one which contains no more than a trace of water or that which might appear in a commercial product; and by "liquid medium" (or "liquid reaction medium") is meant a medium which is liquid at the temperature and pressure employed in effecting the reaction. In other words, the inert, anhydrous, liquid medium in which the reaction may be effected may or may not be a liquid at room temperature (20°–30° C.) or at any other temperature below the reaction temperature. Preferably a liquid medium which is volatile (volatilizable) without decomposition is employed.

From the foregoing description it will be seen that, in accordance with the present invention, there is provided a method of preparing a condensation polymer which comprises effecting reaction, with stirring and under anhydrous conditions, between the reactions of (A), (B) and (C) recited broadly in the second paragraph of this specification and of which numerous examples hereinbefore have been given. Such reactants are specifically and preferably (A) phenylphosphonic dichloride, (B) hydroquinone, and (C) phloroglucinol. All of the reactants may be charged initially to the reaction vessel and heated together with stirring to effect the reaction; or various permutations in the order and timing of adding the reactants to the vessel may be carried out as previously set forth and as illustrated in the examples that follow.

In a specific technique the aforementioned reactants are heated and stirred while they are contained in an inert, anhydrous, organic, liquid medium (solvent or diluent), specifically xylene. The reactants are used in molar proportions such that approximately equivalent or stoichiometric amounts of halogen (chlorine or bromine) and of hydroxyl groups are present in the total reactants. Thus one may, if desired, have up to about 10 mole percent, e.g., from 1 to 5 mole percent, excess hydroxyl in the total reactants. It is advantageous to have no excess of halogen (chlorine or bromine) in the total reactants since otherwise hydrolyzable chlorine or bromine atoms would be present in the final polymer, and in most cases this is undesirable.

In a preferred embodiment of the invention, the reactant of (C) is employed in a molar amount as stated in the third paragraph of the specification, more preferably in a molar amount corresponding to from about 5 to about 25 mole percent, e.g., from about 8 or 9 to about 16 or 17 mole percent, of the total molar amount of the reactants of (B) and (C). Heating is continued, in accordance with this particular embodiment of the invention, until a condensation polymer separates from the aforesaid liquid reaction medium or solvent as an immiscible layer. Thereafter the solvent, e.g., xylene, is removed from the reaction mass, e.g., by distillation. The residue is heated under subatmospheric pressure at a temperature below about 325° C., more particularly below about 300° C. until a condensation polymer is obtained that is a tough, resinous solid when cool.

The reaction is believed to be illustrated by the following equations representing the reaction between phenylphosphonic dichloride, hydroquinone and phloroglucinol:

II

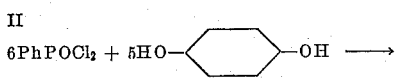

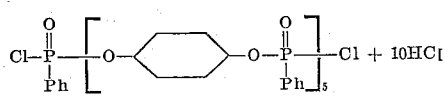

III

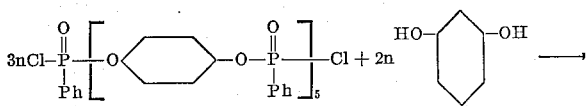

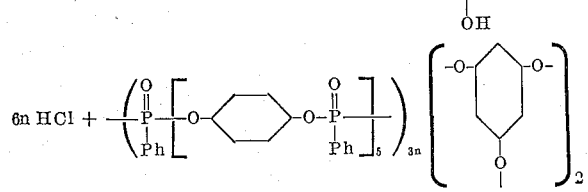

Note: "Ph"=phenyl

The condensation polymers of the invention may be used alone or admixed with, for example, curing agents, fillers, dyes, pigments, stabilizers, natural or synthetic resins, polymeric modifiers or other effect agents in coating, impregnating, adhesive, sealing, laminating, casting, molding, film-forming, and for other purposes, and especially in applications where a high degree of adhesive strength combined with toughness and abrasion-resistance is required. Polymers of the invention wherein up to about one polymeric unit in about 20 (i.e., up to about 5% is cross-linked are fiber-forming.

The polymers herein described and claimed are particularly useful as coatings (e.g., when applied from a melt) for substrates, that is, substrates having on at least a portion of their surface a composition comprising or consisting essentially of a condensation polymer of the invention; also, in producing products or articles comprising laminae bonded together with an adhesive composition or binder comprising or consisting essentially of a condensation polymer of the kind with which this invention is concerned. Examples of substrates useful as a base for the aforementioned condensation polymers are structural materials such as glass, wood, stone, concrete, brick, ceramic materials of all kinds, natural and synthetic boards, and metals, e.g., aluminum and its alloys, copper and its alloys, ferrous metals such as iron and its alloys including ordinary steel, stainless steel, tin- and chromium-coated steels, magnesium and its alloys, and the like, in sheet, cast or other form. Other substrates include solid high-melting (i.e., higher than that of the applied polymer) natural and synthetic, thermoplastic and thermosetting resins, and cellulosic and synthetic papers, fibers, sheets, fabrics and the like.

Articles comprised of laminae bonded together with a laminating composition comprising a condensation polymer of the invention include those wherein two or more of the laminae are constituted of the same or different materials such as, for example, fabrics or sheets of fibrous materials such as cotton, linen, wool, silk and other natural fibrous materials; of synthetic or artificial filamentary or sheet materials (both organic and inorganic) such as viscose and cuprammonium rayons, cellulose esters, e.g., cellulose acetate (including cellulose triacetate), cellulose butyrate, cellulose acetobutyrate, etc., nylons, polyesters, acrylics (i.e., polyacrylonitriles), socalled modacrylics, polyimides, polyimidazoles, polyquinazolines, etc.; and such materials as glass, paper, paperboard, metals (examples of which have been given hereinbefore), and others that will be apparent to those skilled in the art from the foregoing illustrative examples.

The condensation polymers made in accordance with the preferred embodiment of this invention are hard and tough, have high softening points and good thermal stability. They are insoluble in organic solvents, specifically hexane, heptane, benzene, toluene, ether, dioxane, ethanol, acetone, dimethylformamide, dimethylsulfoxide, carbon tetrachloride, methylene dichloride and ethylene dichloride. They are also unaffected by water, dilute acids and alkali.

In order that those skilled in the art may better understand how the present invention can be carried into effect, the following examples are given by way of illustration and not by way of limitation. All parts and percentages are by weight unless otherwise stated:

*Example 1*

Phenylphosphonic dichloride (24.14 g.; 0.124 mole), hydroquinone (11.35 g.; 0.103 mole) and phloroglucinol (1.74 g.; 0.0138 mole) are heated together in xylene (20 ml.) while stirring the reaction mass under an atmosphere of dry $N_2$ in a reaction vessel heated in an oil bath at 150° C. A clear red solution soon forms. This solution becomes yellow after further heating for 1 hour. After a total heating period of 2 hours, the product separates from the solvent (xylene) as an immiscible lower liquid layer. The solvent is then removed, e.g., by distillation at atmospheric pressure, and the residue is heated under atmospheric pressure at 250° C., at which temperature it solidifies with foaming. This solid is finally heated under reduced pressure, more particularly at 250° C. under a pressure of 20 mm. Hg for 30 minutes, and then for 30 minutes at 250° C. under a pressure of 0.1 mm. Hg.

A tough, pale yellow, resinous solid is obtained upon cooling. The yield is 28.2 g., which corresponds to about 100% of the theoretical yield. Analysis shows that it contains 13.3% P (theoretical, 13.5%).

The condensation polymer of this example is crosslinked. It becomes soft and plastic at 300° C. and melts at about 320° C. It is insoluble in water, dilute HCl and dilute NaOH at room temperature, hexane, heptane, benzene, toluene, ether, dioxane, ethanol, acetone, dimethylformamide, dimethylsulfoxide, carbon tetrachloride, methylene dichloride and ethylene dichloride.

When tested for its thermal stability, a 5.00 g. sample of the polymer shows 0% weight loss when heated in air for 2 hours at 300° C. The same sample loses 0.13 g. (2.6%) on further heating in air for 2 hours at 350° C. The visual appearance of the polymer is unchanged after this heat treatment. Another 5.00 g. shows 0.09 g. (1.8%) weight loss when heated under high vacuum (0.1 mm.) for 2 hours at 400° C. The same sample loses 0.36 g. (7.2%) when re-heated under high vacuum for 2 hours at 450° C. Considerable carbonization occurs during the latter treatment.

*Example 2*

Example 1 is repeated using 0.122 mole of phenylphosphonic dibromide instead of 0.124 mole of phenylphosphonic dichloride. A condensation polymer is obtained having properties similar to those of Example 1.

*Example 3*

This example illustrates the production of a resinous condensation polymer wherein a hydrocarbon-substituted, specifically methyl-substituted, phosphonic dichloride is employed as a reactant.

Methylphosphonic dichloride (18.11 g.; 0.136 mole), hydroquinone (13.60 g.; 0.124 mole) and phloroglucinol (1.03 g.; 0.0082 mole) are heated together with stirring in xylene (20 ml.) under nitrogen in a reaction vessel placed in an oil bath at 140° C. A clear solution is obtained after heating for 1 hour, and the product separates as a lower liquid layer after heating for an additional hour. The reaction mass is heated at 140° C. for another 2 hours, after which the solvent is distilled off and the residue is heated to 220° C. at which temperature it froths and solidifies after 1 hour. The solid is finally heated at 250° C. for 1 hour and then at 250°–280° C./0.1 mm. for 1 hour.

A clear, brown, tough resinous solid is obtained in a quantitative yield upon cooling the hot reaction mass. The solid product softens at 200° C. and melts at about 290° C. It is insoluble in common organic solvents of which numerous examples have been given hereinbefore.

Thermal stability tests show that a 3.72 g. sample of the polymer loses 0.13 g. (3.5%) when heated in air for 2 hours at 350° C. The heat treatment causes some darkening of the sample to take place.

*Example 4*

Example 3 is repeated using 0.135 mole of the following hydrocarbon-substituted phosphonic dichlorides in individual runs instead of 0.136 mole of methylphosphonic dichloride:

(a) Tolylphosphonic dichloride
(b) Benzylphosphonic dichloride
(c) n-Hexylphosphonic dichloride
(d) Cyclohexylphosphonic dichloride
(e) Naphthylphosphonic dichloride The resulting condensation polymers have properties similar to those of Examples 1, 2 and 3.

Examples 5, 6 and 7 illustrate the production of cross-linked polymers of phenylphosphonic dichloride, hydroquinone and phloroglucinol having varying degrees of cross-linking in the polymer molecule.

*Example 5*

In the resin of this example there is an average of about 5% of cross-linking, that is, there is about one cross-linked unit for every 19 recurring units in the polymer chain.

Phenylphosphonic dichloride (22.74 g.; 0.1165 mole) and hydroquinone (12.20 g.; 0.1110 mole) are heated with stirring in xylene (10 ml.) under nitrogen in a reaction vessel placed in an oil bath at 150° C. A clear, colorless solution soon forms, and slowly becomes viscous. After 4 hours phloroglucinol (0.47 g.; 0.0037 mole) is added, whereupon a vigorous reaction takes place and the reaction mixture soon starts to foam. The solvent is then distilled off and the residue heated to 250° C. under 20 mm. Hg pressure for 1 hour.

Upon cooling the reaction mass, a tough very pale yellow resin is obtained in the theoretical yield. This resin becomes soft at 100° C. and melts at 200° C.

Thermal stability tests on a sample of this resinous polymer show the following results:

A 4.67 g. sample loses 0.06 g. (1.3%) when heated in air for 2 hours at 300° C. The same sample loses another 0.06 g. (1.3%) when heated in air for 2 hours at 350° C. and an additional 0.29 g. (6.2%) when heated for 2 hours in air at 400° C. This is a total weight loss of 8.8% after heating in air for 6 hours at from 300° through 400° C. At the end of the heating period the sample is clear, brown and shows slight carbonization.

*Example 6*

In this example the degree of cross-linking in the resin averages about 10%.

Phenylphosphonic dichloride (22.35 g.; 0.115 mole), hydroquinone (11.35 g.; 0.103 mole) and phloroglucinol (0.96 g.; 0.0076 mole) are heated with stirring under nitrogen in xylene (30 ml.) at 150° C. as described in Example 5. A clear, yellow solution is soon obtained, and the product separates as a lower liquid layer after 2 hours. The solvent is then distilled off, and the residue heated to 250° C. for 1 hour. Finally, the product is heated at 250°–300° C./20 mm. and at 250°–300° C./0.1 mm. for 1 hour and ½ hour, respectively.

Upon cooling, a tough, pale yellow resin is obtained in a quantitative yield. This resin softens at 280° C. and melts at about 300° C. It is insoluble in common organic solvents, numerous examples of which have been given hereinbefore.

When tested for its thermal stability a 5.00 g. sample loses 0.05 g. when heated in air for 2 hours at 300° C. A 5.14 g. sample loses 0.04 g. (0.8%) when heated under high vacuum (0.1 mm.) for 2 hours at 400° C. The same sample loses an additional 0.15 g. (3.0%) when heated under high vacuum for 2 hours at 450° C.

*Example 7*

In this example the percentage of cross-linked units in the resin averages about 33⅓%.

A resinous condensation polymer is produced following the general procedure described under Examples 1 and 2 using phenylphosphonic dichloride (21.57 g.; 0.1105 mole), hydroquinone (6.08 g.; 0.0552 mole) and phloroglucinol (4.64 g.; 0.0369 mole). The resin is a hard, light-brown solid product, which is obtained in a quantitative yield. It does not melt below 400° C., and is insoluble in common organic solvents such as those previously mentioned.

In Examples 8, 9 and 10 a different dihydroxy compound, viz., p,p'-biphenol, is used in producing cross-linked polymers wherein the average cross-linking varies from 10 to 20%. The resins of all of these examples are insoluble in common organic solvents including those named previously.

*Examples 8*

Phenylphosphonic dichloride (20.14 g.; 0.1032 mole), p,p'-biphenol (17.49 g.; 0.0940 mole) and phloroglucinol (0.782 g.; 0.0062 mole) are heated together in 30 ml. xylene, with stirring, under a nitrogen atmosphere at 150° C. A clear solution is obtained in 1 hour, and after heating for another 30 minutes this solution separates into two layers. The solvent is removed under 20 mm. Hg pressure over a period of 1½ hours, yielding a solid brown residue that is then heated to 270° C./20 mm. for 1 hour and at 200°–270° C./0.1 mm. for another hour.

Upon cooling, a hard resinous product is obtained. It is light-brown in color, softens at 140° C. and melts at about 250° C. The percentage of cross-linked units in the resin averages about 10%.

Thermal stability tests on this polymer show the following:

A 5.0 g. sample of the polymer loses 0.14 g. (2.8%) when heated in air for 2 hours at 350° C. A different sample (3.27 g.) loses 0.22 g. (6.7%) when heated in air for 2 hours at 400° C. (Carbonization is apparent in the latter case.) A 5.00 g. sample loses 0.06 g. (1.2%) when heated under high vacuum (0.1 mm. Hg pressure) for 2 hours at 400° C.; and the same sample loses an additional 0.65 g. (13%) when heated under similar high vacuum for 2 hours at 450° C.

*Example 9*

Essentially the same procedure and conditions are employed as described in Example 8 using phenylphosphonic dichloride (33.70 g.; 0.173 mole), p,p'-biphenol (26.80 g.; 0.144 mole) and phloroglucinol (2.42 g.; 0.0192 mole). The resulting resinous condensation polymer, which contains an average of about 20% cross-linked units, is a tough, amethyst-colored product that softens at 230° C. and melts at about 290° C.

When tested for thermal stability a 4.00 g. sample of the polymer shows 0% weight loss upon heating in air for 2 hours at 300° C. Another sample loses 0.05 g. (1.3%) when heated in air for 2 hours at 350° C. Upon visual inspection both samples appear to be unchanged after this treatment. Still another sample loses 0.22 g. (5.5%) when heated under high vacuum (0.1 mm. Hg pressure) for 2 hours at 450° C. The sample shows no visual evidence of any change after this treatment other than the usual change in form that results from heating to temperatures above the melting point.

Example 10

This example illustrates a method different from that used in Example 9 in preparing a condensation polymer that contains, as does also the product of Example 9, an average of one cross-linked unit for every 19 recurring units in the polymer chain.

Phenylphosphonic dichloride (33.52 g.; 0.172 mole) and p,p'-biphenol (26.65 g.; 0.143 mole) are heated together with stirring in xylene (25 ml.) under an inert gas, specifically nitrogen, in a reaction vessel placed in an oil bath at 170° C. A clear solution is formed after heating the reaction mass for 2 hours. Heating is continued for an additional 2 hours, after which phloroglucinol (2.41 g.; 0.019 mole) is added. The resulting mixture becomes very viscous almost immediately. The solvent is then distilled off, and the residue is heated to 190° C. for 20 minutes, at 220°–250° C./20 mm. for 1 hour and finally at 250° C./0.1 mm. for 30 minutes.

Upon cooling, a tough, resinous, amethylst-colored, solid product is obtained that softens at 280° C. and melts at over 300° C.

Thermal stability tests on a sample of this resinous condensation polymer show the following results:

A 4.00 g. sample of the polymer loses 0.02 g. (0.5%) when heated in air for 2 hours at 300° C. Another 4.0 g. sample loses 0.08 g. (2.0%) when heated in air for 2 hours at 350° C. Both samples visually appear to be unchanged after this heat treatment. Another 4.0 g. sample loses 0.19 g. (4.75%) when heated under high vacuum (0.1 mm.) for 2 hours at 450° C. There is no apparent visual change in the heat-treated sample.

In Examples 11 and 12 still another different species of a dihydroxy compound, viz., p,p'-sulfonyldiphenol, is employed in producing cross-linked polymers wherein the average cross-linking varies from 5 to 10%. The resulting resinous condensation polymers are insoluble in common organic solvents including those stated hereinbefore.

Example 11

Phenylphosphonic dichloride (22.09 g.; 0.180 mole) and phloroglucinol (0.45 g.; 0.0036 mole) are heated in xylene (20 ml.) with stirring under nitrogen in a reaction vessel placed in an oil bath at 150° C. A clear solution is obtained after heating for 1½ hours, and this soon separates into two liquid layers. The reaction mass partially solidifies, and froths up after heating for an additional 2 hours. The solvent is distilled off, and the solid residue is heated to 250° C. for 30 minutes and finally at 250°–300° C./20 mm. for 1 hour and at 250°–300° C./0.1 mm. for 1 hour.

Upon cooling there is obtained a quantitative yield of a hard, tough, very pale yellow resin that softens at 180° C. and melts at about 230° C. The percentage of crosslinking in the polymer averages about 5%.

A thermal-stability test of a 5.00 g. sample of the polymer shows 0% weight loss when heated in air for 2 hours at 300° C. The same sample loses 0.06 g. (1.2%) when heated in air for 2 hours at 350° C. There is no visual evidence of any change in the heat-treated sample. However, upon re-heating the same sample in air for 2 hours at 400° C. considerable carbonization takes place, and the weight loss is 1.94 g. (40%).

Example 12

The same procedure is followed as described under Example 11 using phenylphosphonic dichloride (22.49 g.; 0.1153 mole), p,p'-sulfonyldiphenol (26.20 g.; 0.1049 mole) and phloroglucinol (0.88 g.; 0.0070 mole). A hard, very pale yellow, resinous solid is obtained in a quantitative yield. It softens at 210° C. and melts at about 250° C. The percentage of crosslinking in the polymer averages about 10%.

Thermal-stability tests show that a 5.00 g. sample has 0% weight loss when heated in air at 300° C. for 2 hours. The same sample loses 0.16 g. (3.2%) when re-heated in air for 2 hours at 350° C. There is no visual evidence of any change in the heat-treated polymer. However, when the same sample is re-heated in air for 2 hours at 400° C., considerable carbonization takes place and the weight loss is 0.34 g. (7.0%). A 4.79 g. sample loses 0.30 g. (6.3%) when heated under high vacuum for 2 hours at 400° C.

Example 13

Example 1 is repeated using 0.015 mole of 2,4,6-trihydroxytoluene instead of 0.0138 mole of phloroglucinol as in Example 1. The resulting resinous condensation polymer, which is obtained in a quantitative yield, has properties similar to those of the condensation polymers of prior examples.

The following example illustrates that when one is not particularly interested in the properties that characterize the final condensation polymer and one wants to produce a substantially 100% cross-linked polymer, then the dihydroxy aromatic compound can be omitted as a reactant and the reaction effected between only two reactants, viz., an organophosphonic dihalide of the kind embraced by Formula I and a trihydroxy (or higher polyhydroxy) aromatic compound, more particularly a trihydroxy (or higher polyhydroxy) aromatic hydrocarbon, numerous examples of which have been given hereinbefore.

Example 14

Phenylphosphonic dichloride (19.98 g.; 0.1025 mole) and phloroglucinol (8.63 g.; 0.0685 mole) are stirred under nitrogen in xylene (20 ml.) in a reaction vessel placed in an oil bath at 140° C. A clear, red solution soon forms that separates into two layers after heating for 1 hour. The lower layer solidifies to a light brown solid over a period of 2 hours' additional heating. The solvent is distilled off, after which the residue is heated to 245° C. for 30 minutes, at 250° C./20 mm. for 45 minutes and at 250°–300° C./0.1 mm. for 1 hour.

The product obtained in a theoretical yield upon cooling the reaction mass is a brittle, flaky, amethyst-colored resinous material. It is insoluble in common organic solvents including those previously mentioned. It can be pulverized to 100- to 300-mesh fineness, and finer, and used, for example, as a filler or coloring agent, in paints and other protective coating compositions, and in various thermoplastic and thermosetting molding compositions such as ABS (acrylonitrile-butadiene-styrene) resins, polyacrylates and -methacrylates, polystyrene, phenol-, urea- and melamine-formaldehyde resins, alkyd resins, organopolysiloxanes, natural resins, etc.

When tested for its thermal stability a 2.00 g. sample of the polymer shows 0% weight loss when heated in air for 2 hours at 300° C. However, the same sample loses 0.19 g. (9.5%) after heating for an additional 2 hours in air at 350° C. Considerable decomposition as evidenced by carbonization is apparent. A 3.00 g. sample of the polymer loses 0.07 g. (2.3%) after heating under high vacuum (0.1 mm. Hg pressure) for 2 hours at 400° C. Additional heating under high vacuum for 2 hours at 450° C. results in a weight loss of 0.74 g. (24.6%) with carbonization.

Example 15

This example illustrates the production of laminated articles and includes test data on the resulting laminates. The polymers, A, B, C and D, employed in these tests are described briefly below. Their preparation is essentially the same as that described in the foregoing examples utilizing the same reactants:

(A) Prepared from phenylphosphonic dichloride, hydroquinone and phloroglucinol such that there is an average of one cross-link for every 19 recurring units. Melting point about 200° C.

(B) Prepared from phenylphosphonic dichloride, p,p'-biphenol and phloroglucinol such that there is an average of one cross-link for every 19 recurring units. Melting point about 200° C.

(C) Similar to B except that there is an average of one cross-link for every 9 recurring units. Melting point about 250° C.

(D) Prepared from phenylphosphonic dichloride, p,p'-sulfonylbiphenol and phloroglucinol such that there is an average of one cross-link for every 19 recurring units. Melting point approximately 220° C.

The adhesive tests are carried out on an apparatus capable of measuring the load applied on the sample under test. The bonds are tested both for tensile strength and shear strength. The tests for tensile strength and for shear strength are made by A.S.T.M. methods D1344–57 and D1002–53T, despectively. These tests are modified in certain cases to the extent that they are not limited to metal-to-metal bonds as specified in the aforementioned test procedures.

The glass samples used are commercially available pre-cleaned microscope slides, 75 mm. long, 38 mm. wide and 1 mm. thick. These are used without further treatment of any kind. The aluminum samples are either strips 1½" wide, 5" long and 1/16" thick, or bars 2" long, 1" wide and ½" thick. The carbon-steel samples are similar. All metal samples are sanded to give a bright surface with coarse emery cloth and then wiped with a tissue soaked in carbon tetrachloride prior to use.

Samples are prepared by heating the materials to be joined to the melting temperature of the polymer. The polymer is then applied, the joints prepared and allowed to cool under approximately 7 lb. total pressure. Tensile-strength specimens consist of bars cross-lapped at right angles to give 1 square inch of adhered surface. Shear specimens consist of lapped strips or slides of approximately 1 square inch of adhered area.

The results obtained utilizing the four polymers hereinbefore described are as follows:

TABLE I.—GLASS-TO-GLASS—SHEAR TEST

| Sample | Lap (inch) | Width (inch) | Max. Load (lb.) | Type of Failure |
|---|---|---|---|---|
| B | 0.53 | [1] 1.47 | 290 | Glass. |
|   | 0.58 | 1.47 | 250 | Do. |
|   | 0.50 | 1.47 | 430 | Do. |
|   | 0.63 | 1.47 | 420 | Do. |
| A | 0.59 | 1.47 | 265 | Do. |
|   | 0.62 | 1.47 | 240 | Adhesive. |
|   | 0.53 | 1.47 | 273 | Glass. |
|   | 0.59 | 1.47 | 143 | Adhesive. |

[1] 38 mm.

TABLE II.—STEEL-TO-GLASS—SHEAR TEST

| Sample | Lap (inch) | Width (inch) | Max. Load (lb.) | Type of Failure |
|---|---|---|---|---|
| A | 0.53 | [1] 1.47 | 205 | Glass. |
| A | 0.55 | 1.47 | 275 | Adhesive. |
| C | 0.62 | 1.47 | 175 | Glass. |

[1] 38 mm.

TABLE III.—ALUMINUM-TO-ALUMINUM—SHEAR TEST

| Sample | Lap (inch) | Width (inch) | Max. Load (lb.) | Type of Failure |
|---|---|---|---|---|
| A | 0.61 | 1.50 | 227 | Adhesive. |
|   | 0.55 | 1.50 | 201 | Do. |
| C | 0.59 | 1.50 | 362 | Do. |
|   | 0.59 | 1.50 | 305 | Do. |

TABLE IV.—STEEL-TO-STEEL—SHEAR TEST

| Sample | Lap (inch) | Width (inch) | Max. Load (lb.) | Type of Failure |
|---|---|---|---|---|
| A | 0.73 | 1.50 | 309 | Adhesive. |
|   | 0.51 | 1.50 | 314 | Do. |

TABLE V.—ALUMINUM-TO-ALUMINUM—TENSILE TEST

| Sample | Max. Load (lb./sq. in.) | Type of Failure |
|---|---|---|
| A | 212 | Adhesive. |
|   | 320 | Do. |
| C | 300 | Do. |
|   | 292 | Do. |
| D | 215 | Do. |
|   | 170 | Do. |

TABLE VI.—STEEL-TO-STEEL—TENSILE TEST

| Sample | Max. Load (lb./sq. in.) | Type of Failure |
|---|---|---|
| A | 400 | Adhesive. |
|   | 465 | Do. |
| C | 290 | Do. |
|   | 371 | Do. |
| D | 336 | Do. |
|   | 370 | Do. |

*Example 16*

The polymers described under (A), (B), (C) and (D) of Example 15 are individually applied to various substrates including glass and metals, specifically aluminum and steel, by first heating the substrate up to the melting point of the polymer. The polymer, usually in finely ground state and at ambient temperature or after pre-heating to a temperature below its softening point, is applied to the substrate and then spread over its surface with a knife-edge or similar type of spreading device. Upon cooling, protective coatings are formed on the substrates that are hard, tough and adhere tenaciously thereto.

As will be obvious to those skilled in the art, modifications of the instant invention can be made in the light of the foregoing disclosure without departing from the spirit and scope of the disclosure or from the scope of the appended claims.

I claim:
1. A composition comprising a condensation polymer of reactants comprising
   (A) an organophosphonic dihalide represented by the general formula

$$R-P\begin{matrix}O\\\|\end{matrix}\begin{matrix}X\\X\end{matrix}$$

where R represents a radical selected from the group consisting of alkyl, aralkyl, aryl and alkaryl radicals, and X represents a radical selected from the group consisting of chlorine and bromine atoms,
   (B) a dihydroxy aromatic compound wherein the hydroxy groups are attached directly to the aromatic nucleus and wherein the said hydroxy groups are attached to non-adjacent carbon atoms, and
   (C) an aromatic compound having at least three hydroxy groups attached directly to the aromatic nucleus and wherein the said hydroxy groups are attached to non-adjacent carbon atoms,
the reactants of (A), (B) and (C) being used in molar proportions such that approximately stoichiometrical amounts of halogen and of hydroxy groups are present in the total reactants, and the reactant of (C) being employed in a molar amount corresponding to from about 1 to about 50 mole percent of the total molar amount of the reactants of (B) and (C).

2. A composition as in claim 1 wherein X represents a chlorine atom.
3. A composition as in claim 1 wherein R represents an aryl radical.
4. A composition as in claim 3 wherein the aryl radical is the phenyl radical.

5. A composition as in claim 1 wherein reactant (B) is a dihydroxy aromatic hydrocarbon wherein the hydroxy groups are attached to non-adjacent carbon atoms.

6. A composition as in claim 1 wherein reactant (C) is a trihydroxy aromatic hydrocarbon wherein the hydroxy groups are attached to non-adjacent carbon atoms.

7. A product comprising a condensation polymer of reactants consisting essentially of
- (A) phenylphosphonic dichloride,
- (B) a dihydroxy aromatic hydrocarbon wherein the hydroxy groups are attached directly to the aromatic nucleus and wherein the said hydroxy groups are attached to non-adjacent carbon atoms, and
- (C) a trihydroxy aromatic hydrocarbon wherein the hydroxy groups are attached directly to the aromatic nucleus and wherein the said hydroxy groups are attached to non-adjacent carbon atoms, the reactants of (A), (B) and (C) being used in molar proportions such that approximately stoichiometrical amounts of chlorine of the reactant of (A) and of hydroxy groups of the reactants of (B) and (C) are present in the total reactants, and the reactant of (C) being employed in a molar amount corresponding to from about 1 to about 50 mole percent of the total molar amount of the reactants of (B) and (C).

8. A product as in claim 7 wherein the dihydroxy aromatic hydrocarbon of (B) is hydroquinone.

9. A product as in claim 7 wherein the trihydroxy aromatic hydrocarbon of (C) is phloroglucinol.

10. A product as in claim 7 wherein the dihydroxy aromatic hydrocarbon of (B) is hydroquinone and the trihydroxy aromatic hydrocarbon of (C) is phloroglucinol.

11. A product as in claim 7 wherein the reactant of (C) is employed in a molar amount corresponding to from about 5 to about 25 mole percent of the total molar amount of the reactants of (B) and (C).

12. A self-supporting film of the composition defined in claim 1.

References Cited

UNITED STATES PATENTS 2,435,252  2/1948  Toy _____ 260—47

SAMUEL H. BLECH, *Primary Examiner.*

WILLIAM H. SHORT, *Examiner.*

M. GOLDSTEIN, *Assistant Examiner.*